US012145763B2

(12) United States Patent
Cossey

(10) Patent No.: US 12,145,763 B2
(45) Date of Patent: Nov. 19, 2024

(54) LABEL APPLICATOR FOR VARIED SURFACES

(71) Applicant: United Parcel Service of America, Inc., Atlanta, GA (US)

(72) Inventor: James Cossey, Snellville, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 17/118,096

(22) Filed: Dec. 10, 2020

(65) Prior Publication Data

US 2022/0185527 A1 Jun. 16, 2022

(51) Int. Cl.

*B65C 9/36* (2006.01)
*B65C 9/02* (2006.01)
*B65C 9/08* (2006.01)

(52) U.S. Cl.

CPC .................. *B65C 9/36* (2013.01); *B65C 9/02* (2013.01); *B65C 9/08* (2013.01)

(58) Field of Classification Search

CPC .................................... B65C 9/26; B65C 9/36
See application file for complete search history.

(56) References Cited

U.S. PATENT DOCUMENTS 4,680,082 A * 7/1987 Kearney .................. B65C 9/28 156/542
4,857,121 A 8/1989 Markley et al.
5,092,954 A * 3/1992 Braun ............... B29C 66/81422 156/540
5,470,420 A * 11/1995 Yokajty ................. B65C 9/0006 156/542

(Continued)

FOREIGN PATENT DOCUMENTS

EP 3012203 A1 4/2016
JP 2002-308241 A 10/2002

(Continued)

OTHER PUBLICATIONS

International Search Report and Written Opinion for PCT application No. PCT/US2021/055447, mailed on Feb. 28, 2022, 15 pages.

(Continued)

*Primary Examiner* — Philip C Tucker
*Assistant Examiner* — John Blades
(74) *Attorney, Agent, or Firm* — Shook, Hardy & Bacon L.L.P.

(57) ABSTRACT

Subject matter described in this disclosure relates to a label applicator for varied surfaces. In some instances, the label applicator may include one or more elements that may adjust to individual package properties and may adjust from one package to the next. For example, in one aspect the label applicator may include a label-retaining surface that is nonlinear. In other examples, the label applicator may include a force attenuator that dampens compressive forces between the label applicator and the package. In a further example, the label applicator may include an articulating joint that permits pivotable adjustment when a label applicator contacts a package. In yet another example, the label applicator may include a magnetic coupling attaching the label applicator to an actuator to provide a breakaway and reattachment mechanism.

20 Claims, 9 Drawing Sheets

(56) References Cited

U.S. PATENT DOCUMENTS

| | | | | |
|---|---|---|---|---|
| 5,733,410 | A * | 3/1998 | Gore | B29C 63/02 156/542 |
| 6,006,808 | A * | 12/1999 | Ewert | B29C 66/1122 156/542 |
| 6,698,571 | B2 | 3/2004 | Bonnet | |
| 6,847,181 | B2 * | 1/2005 | Brooks | B23Q 17/003 318/568.11 |
| 7,343,953 | B2 * | 3/2008 | Smith | B65C 1/021 156/566 |
| 9,004,347 | B2 | 4/2015 | Casey et al. | |
| 10,424,227 | B1 | 9/2019 | Valenti et al. | |
| 2002/0012134 | A1 | 1/2002 | Calaway | |
| 2003/0144871 | A1 | 7/2003 | Turbeville et al. | |
| 2005/0230479 | A1 | 10/2005 | Chapman et al. | |
| 2006/0070700 | A1 | 4/2006 | Cone | |
| 2007/0250326 | A1 | 10/2007 | Kadaba | |
| 2008/0121688 | A1 | 5/2008 | Harrop | |
| 2008/0301009 | A1 | 12/2008 | Plaster et al. | |
| 2010/0096089 | A1 * | 4/2010 | Lichtenberg | B65C 9/26 156/538 |
| 2010/0187306 | A1 | 7/2010 | Solomon | |
| 2010/0230054 | A1 * | 9/2010 | Sugawara | B65C 9/1884 156/361 |
| 2011/0007343 | A1 | 1/2011 | Hopper et al. | |
| 2011/0146912 | A1 * | 6/2011 | Howarth | B41M 5/282 156/350 |
| 2012/0193022 | A1 * | 8/2012 | Yamasita | B65C 9/42 156/354 |
| 2014/0297441 | A1 | 10/2014 | Thams et al. | |
| 2014/0361076 | A1 | 12/2014 | Iantorno et al. | |
| 2016/0063770 | A1 | 3/2016 | Bowers et al. | |
| 2016/0072626 | A1 | 3/2016 | Kouladjie | |
| 2016/0263623 | A1 | 9/2016 | Wojdyla et al. | |
| 2016/0267620 | A1 | 9/2016 | Calhoon et al. | |
| 2017/0322090 | A1 | 11/2017 | Jones et al. | |
| 2018/0290781 | A1 | 10/2018 | Zeljic et al. | |
| 2018/0341911 | A1 | 11/2018 | Daoura et al. | |
| 2019/0039772 | A1 | 2/2019 | Le | |
| 2020/0002042 | A1 | 1/2020 | Christman et al. | |
| 2020/0016916 | A1 | 1/2020 | Sievers et al. | |
| 2020/0055094 | A1 | 2/2020 | De Bruijn et al. | |
| 2020/0130879 | A1 | 4/2020 | Wood et al. | |
| 2020/0369425 | A1 * | 11/2020 | Dyke | B65C 3/163 |
| 2021/0187555 | A1 | 6/2021 | Ashworth | |
| 2021/0201258 | A1 | 7/2021 | Perez | |
| 2022/0024628 | A1 | 1/2022 | Solanki et al. | |
| 2022/0024629 | A1 | 1/2022 | Solanki et al. | |
| 2022/0188558 | A1 | 6/2022 | Cossey | |

FOREIGN PATENT DOCUMENTS

| | | | |
|---|---|---|---|
| WO | 2015/199131 | A1 | 12/2015 |
| WO | 2016/106345 | A1 | 6/2016 |
| WO | 2018/088899 | A1 | 5/2018 |
| WO | 2020/115126 | A1 | 6/2020 |

OTHER PUBLICATIONS

International Search Report and Written Opinion received for PCT Patent Application No. PCT/US2021/059136, mailed on Feb. 23, 2022, 12 pages.

Non-Final Office Action received for U.S. Appl. No. 17/117,429, mailed on Aug. 26, 2022, 12 pages.

Final Office Action received for U.S. Appl. No. 17/117,429, mailed on Nov. 21, 2022, 18 pages.

* cited by examiner

LABEL APPLICATOR FOR VARIED SURFACES

CROSS REFERENCE TO RELATED APPLICATIONS

This application is related by subject matter to U.S. Non-provisional application Ser. No. 17/117,429, co-filed herewith on Dec. 10, 2020 and entitled "System and Method For Indicia Avoidance In Indicia Application," which is incorporated herein by reference in its entirety.

BACKGROUND

Labels are applied to surfaces in various contexts. For example, adhesive labels may be affixed to packages for branding, shipping, logistics, organization, and the like. Sometimes, labels are consecutively applied to multiple packages (e.g., hundreds, thousands, millions, etc.), such as packages being processed, one after the next, for shipping. When the multiple packages have relatively uniform properties (e.g., package size, package position, surface, etc.), labels may be automatedly affixed to a package using a robot or other labeling machine, which may, among other things, automatedly press or apply the label against a surface of the package. However, when the package properties vary from one package to the next (e.g., package shape, package position, package size, package density, package surface, etc.), and/or when the packages are in motion (e.g., on a conveyor), a conventional label applicator may fail to adjust from one package to the next and may fail to apply a label in a manner that achieves desired label application. In some instances, these failures may result in insufficient surface contact on the package resulting in unintentional detachment or other issues rendering labels not usable (e.g., tearing, folding, wrinkling, etc.). Unintentionally detached labels, or otherwise unusable labels, may cause various undesirable issues, such as improper downstream processing, packages with multiple labels (e.g., when a label falls off one package and adheres to another package), and the like. In these cases, packages may be lost, misplaced, misrouted, and/or may become untraceable due to misapplication of labels.

SUMMARY

Embodiments of the present disclosure relate to a label applicator for varied surfaces. A label applicator is described that improves the likelihood labels will be applied in a manner which reduces the likelihood of unintentional detachment or misapplication across multiple packages having varied properties from one package to the next.

In contrast to conventional devices, the present label applicator includes one or more elements that may adjust to individual package properties and may adjust from one package to the next. For example, in one aspect the label applicator may include a label-retaining surface that is nonlinear and that may, at least partially, conform to a package having a nonlinear surface. In another aspect, the label applicator may include a force attenuator that reduces impact between the label applicator and the package when the label applicator is driven into the package. In a further aspect, the label applicator may include an articulating joint that pivots when a label-retainer head is driven into a package to permit a label-retaining surface to adjust to the surface orientation of the package. In yet another aspect, the label applicator may include a magnetic coupling attaching the label applicator to an actuator, the magnetic coupling providing a rapid breakaway and reattachment mechanism.

BRIEF DESCRIPTION OF THE DRAWINGS

Additional aspects of the present disclosure directed to a label applicator are described in detail below with reference to the attached drawing figures, which are incorporated herein by reference and are briefly described directly below.

DETAILED DESCRIPTION

Figure 1:
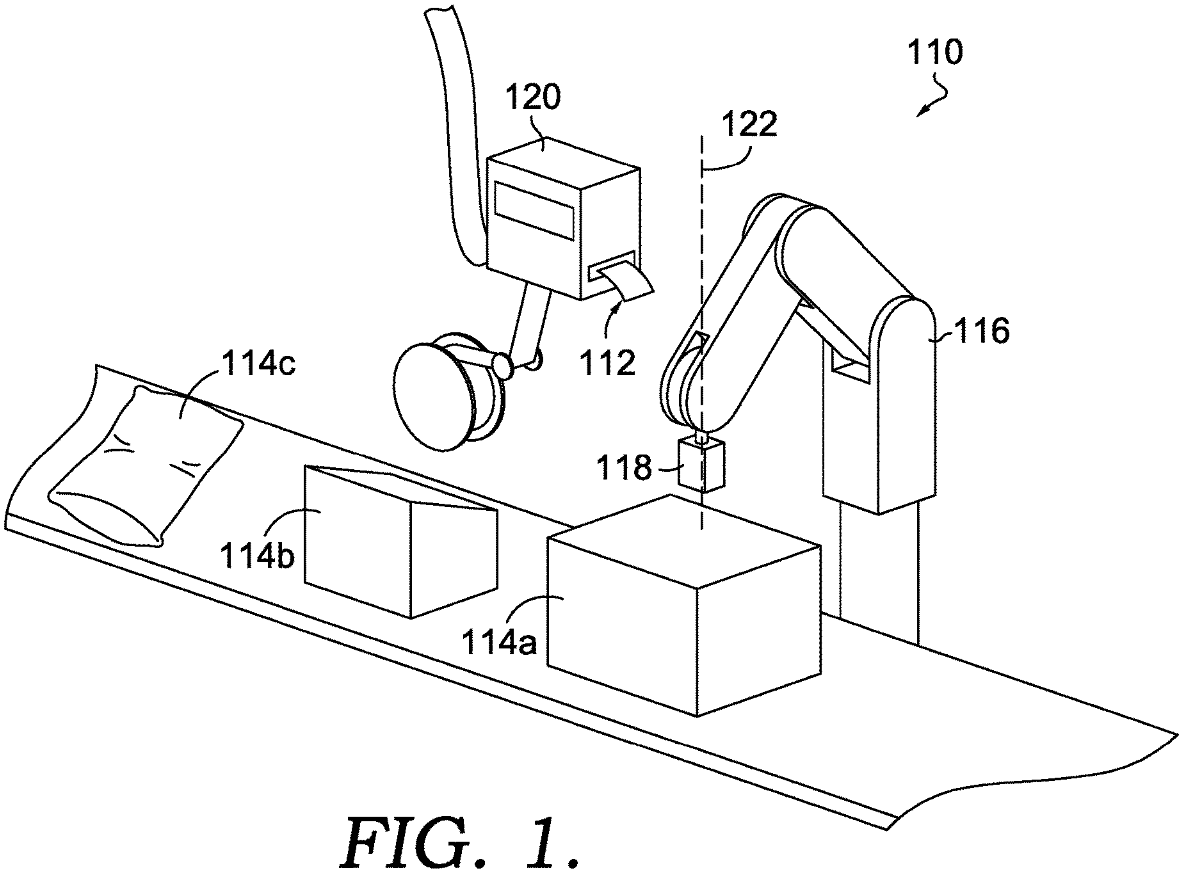
FIG. 1 is an illustration of an environment in which labels may be applied to multiple packages, in accordance with an embodiment of the present disclosure.

Subject matter related to a label applicator is described throughout this Specification in detail and with specificity in order to meet statutory requirements. The aspects described throughout this Specification are intended to be illustrative rather than restrictive, and the description itself is not intended necessarily to limit the scope of the claims. Rather, the claimed subject matter might be practiced in other ways to include different elements or combinations of elements that are equivalent to the ones described in this Specification and that are in conjunction with other present technologies or future technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

Aspects are disclosed related to a label applicator for varied surfaces. More specifically, a label applicator is described that improves the likelihood labels will be applied in a manner which reduces the likelihood of unintentional detachment or misapplication across multiple packages having varied properties from one package to the next. For example, in one aspect, the label applicator may include a label-retaining surface that is at least partially nonlinear and that, when pressed or driven against a nonlinear package surface, may at least partially conform to the surface. Among other things, this at least partial mating or nesting of the label-retaining surface against the package surface during label application may increase a surface contact area between the label and the package surface and increase a label surface area adhered to the package.

In another aspect, the label applicator may include a force attenuator that reduces or dampens compressive forces arising from contact or impact between the label applicator and the package when the label applicator is driven into the package. For example, when the label applicator is pressed or driven against a package surface, the force attenuator may cushion the impact, which may increase dwell time at a particular location on the package surface and reduce the likelihood that the label applicator will glance off, or slide away from, the surface location.

In yet another aspect, the label applicator may include an articulating joint that pivots when a label applicator is driven into a package. Among other things, the pivot adjustment may angularly adjust an orientation of the label applicator to better face or mate with a surface orientation of the package upon initial impact.

In yet a further aspect, the label applicator may include a magnetic coupling attaching the label applicator to an actuator. In some instances, the magnetic coupling may provide a rapid breakaway and reattachment mechanism, such as when the label applicator might receive a side impact.

Referring to FIG. 1, FIG. 1 illustrates an environment 110 in which labels 112 may be applied to multiple packages 114*a*-114*c* (e.g., hundreds, thousands, millions, etc., of packages). The packages 114*a*-114*c* may be processed one after the next for various reasons, such as for shipping, storing, organizing, shelving, logistics, tracking, etc. In addition, FIG. 1 illustrates a robotic arm 116 that may execute various operations to apply labels 112 to the packages 114*a*-114*c*. For example, the robotic arm 116 may move a label applicator 118 to a label dispenser 120 to retrieve a label and then traverse the label applicator 118 along a motion path 122 to cause a label (not viewable in FIG. 1) retained by the label applicator 118 to contact the package 114*a*. The robotic arm 116 is an example of one type of actuator (e.g., linear actuator) that may be used to traverse a label applicator along a motion path, and other aspects of the disclosure may include a different type of actuator. For example, other types of actuators may include a hydraulic actuator, servo-motor with drive screw, pneumatic actuator, geared press or stamp, manual press or stamp, and the like.

Figure 2:
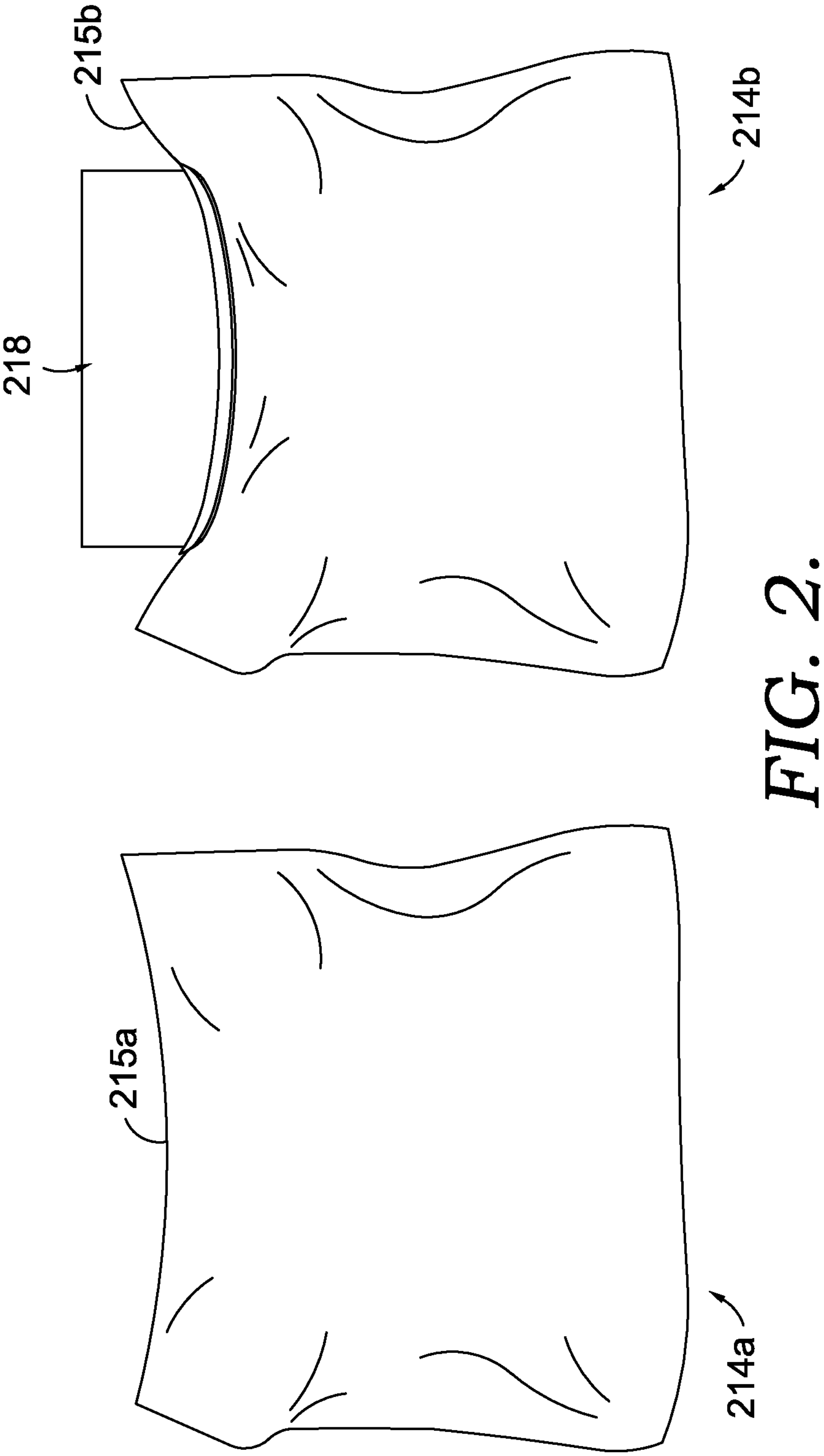
FIG. 2 is an illustration of a label applicator applying a label to a package, in accordance with an embodiment of the present disclosure.

In one aspect of the disclosure, properties of the packages 114*a*-114*c* may vary from one package to the next. Examples of properties that may vary include a surface shape or orientation, as well as a package density, among others. For example, packages may have various convex or concave surfaces at various orientations relative to the label applicator 118. In addition, some packages may be constructed of cardboard or other more rigid materials, whereas other packages may include plastic shipping bags, poly mailers, and the like, which can affect the surface properties (e.g., orientation, shape, etc.) when a label is pressed onto the package surface. Referring to FIG. 2, FIG. 2 illustratively depicts some of these aspects. For example, FIG. 2 depicts a profile of a side view of a first package 214*a* and a second package 214*b*, each of which includes a respective surface 215*a* and 215*b* to receive a label (e.g., adhesive label). As depicted in FIG. 2, the surface 215*a* and 215*b* is curved (e.g., concave) or otherwise nonlinear (e.g., not flat or not planar), and this state of the surface 215*a* and 215*b* may arise from the properties of the packaging (e.g., package materials, package shape, contents shape, etc.), from pressure applied by a label applicator (218), or a combination thereof. In some instances, accounting for these varied surfaces when applying a label may improve a likelihood that labels may not unintentionally detach from the surfaces once applied or otherwise be misapplied.

Figure 3:
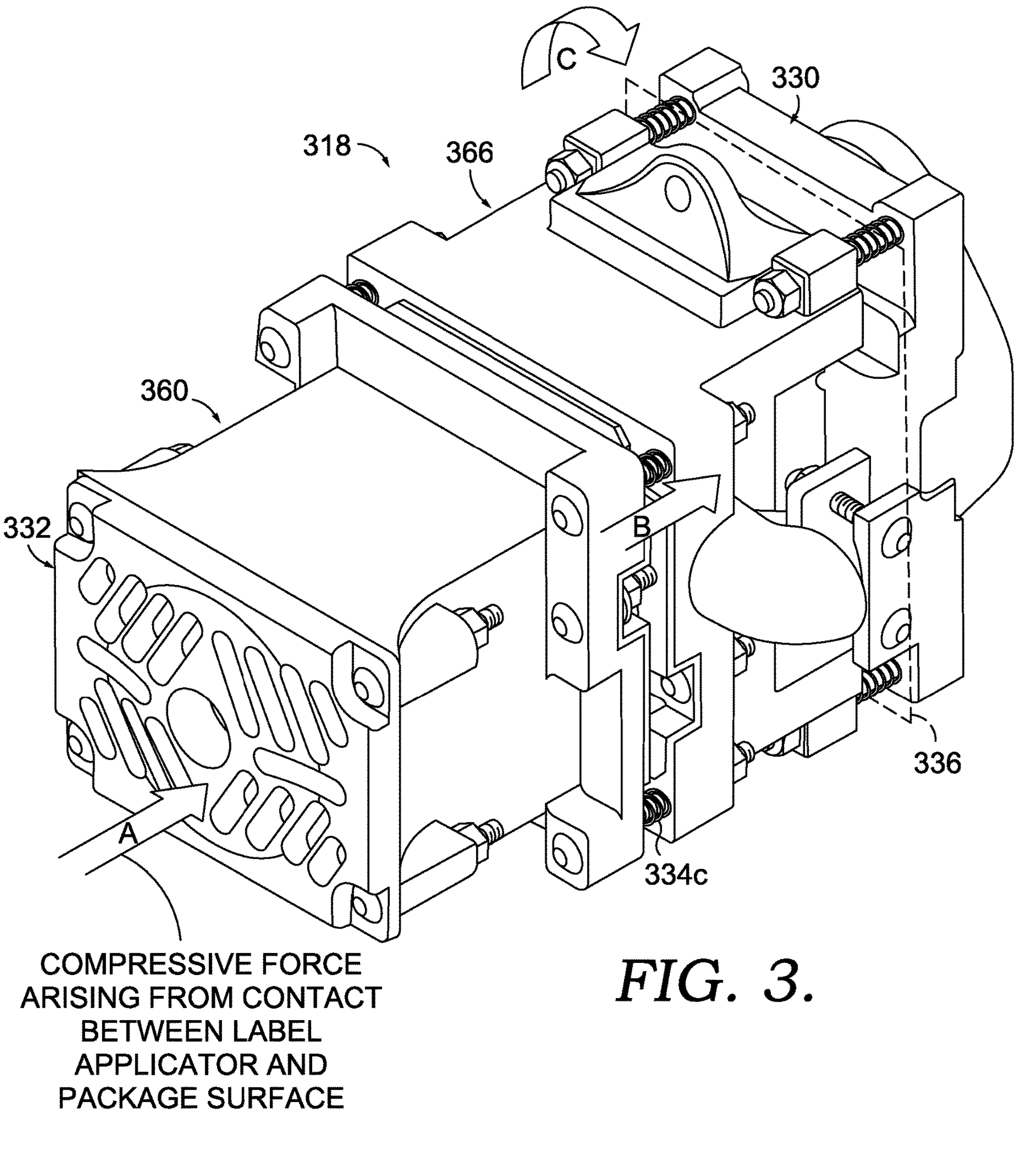
FIG. 3 is an illustration of another label applicator, in accordance with an embodiment of the present disclosure.

Referring now to FIG. 3, FIG. 3 depicts a label applicator 318 for varied surfaces in accordance with an aspect of the present disclosure. In some aspects, the label applicator 318 might be coupled to an actuator (e.g., robot arm 116 in FIG. 1), which traverses the label applicator 318 along a motion path to apply a label to a surface (e.g., surface of a package). The label applicator 318 may also be referred to as an "end effector" or more simply a "tool" that is releasably attachable to the actuator.

The label applicator 318 includes a tool base 330 that is releasably attachable to an actuator (e.g., robot arm, linear actuator, hydraulic actuator, pneumatic actuator, servo-driven actuator, etc.). In addition, the label applicator 318 includes a label-retainer head 332 that is directly or indirectly coupled to the tool base 330 and that holds a label (at least temporarily) while the label applicator 318 applies a label to a package. The label applicator 318 may include various other components, such as a negative-pressure source (e.g., to apply suction to a label for holding the label against the label-retainer head 332 prior to application), a force attenuator (e.g., compression spring 334*a-c*) to dampen forces generated when the label applicator 318 engages a package surface, and an articulation joint 336 to pivot when the label applicator engages a package surface. Additional details of each of these elements are provided in other portions of this disclosure.

Figure 4:
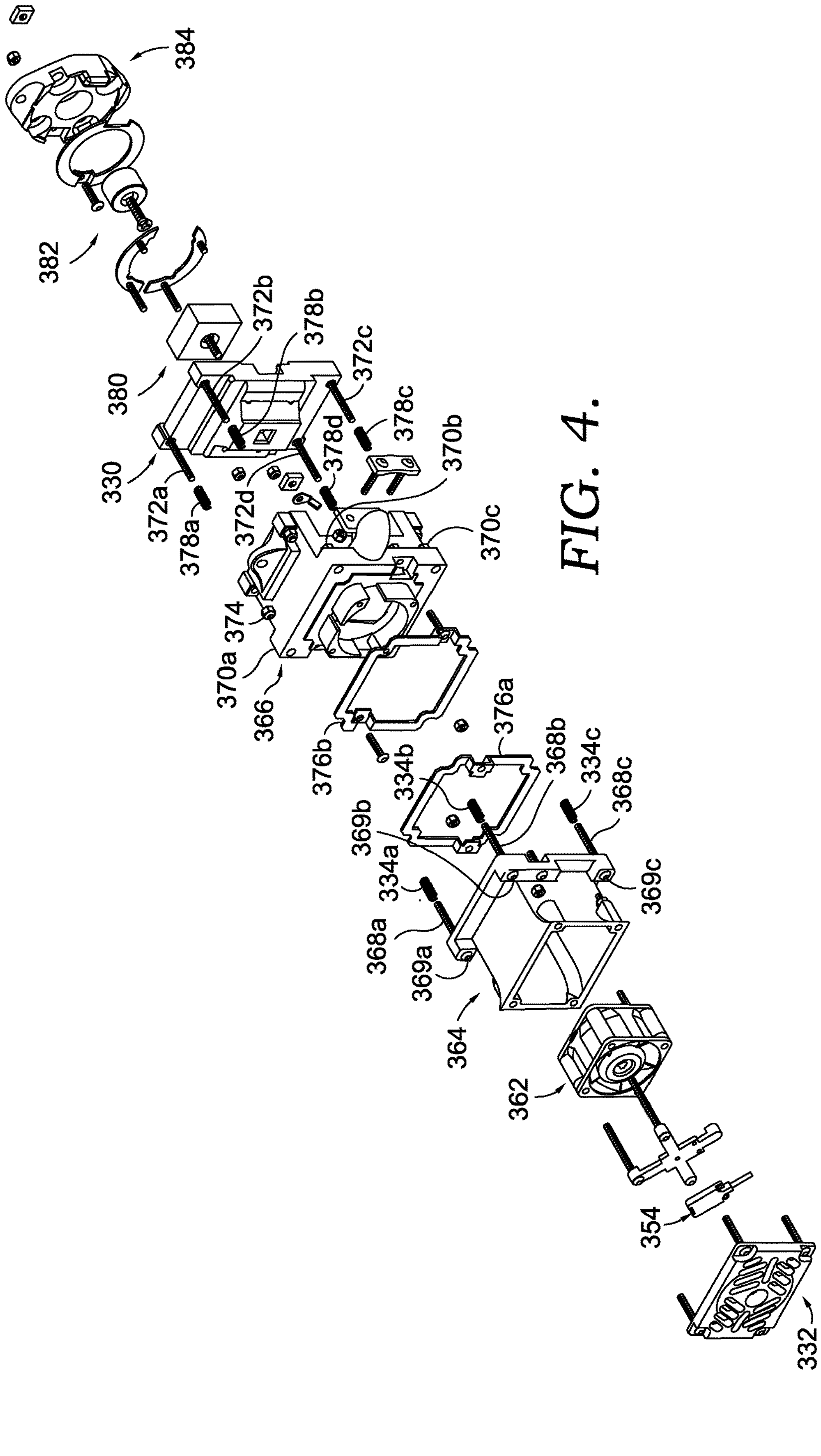
FIG. 4 is an exploded view of the label applicator in FIG. 3, in accordance with an embodiment of the present disclosure.
Figure 5A:
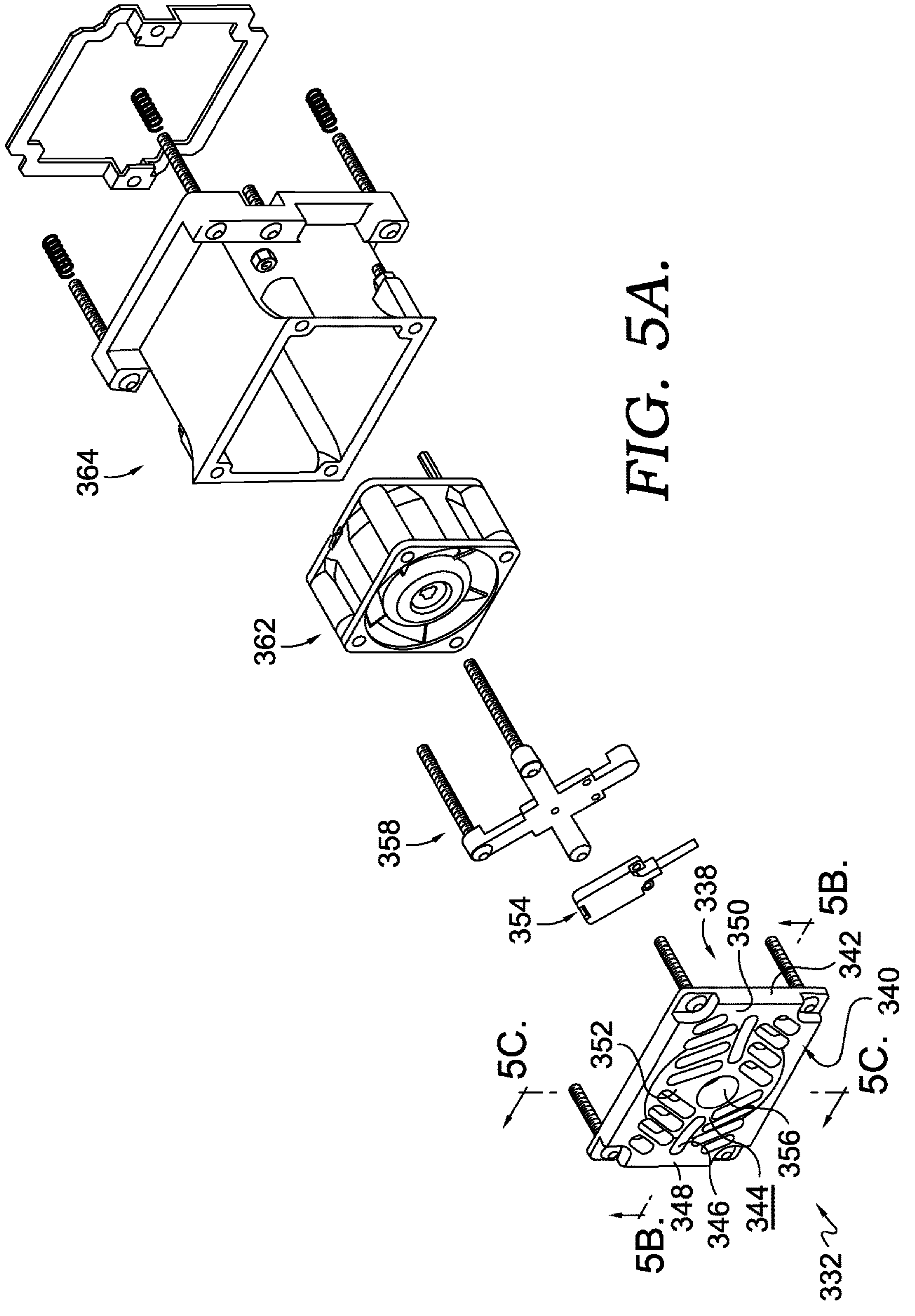
FIG. 5A is an enlarged view of a label-retaining surface and a fan assembly from FIG. 4, in accordance with an embodiment of the present disclosure.

Referring now to FIG. 4, an exploded view of the label applicator 318 is illustrated, including the tool base 330 and the label-retainer head 332, among other elements. In addition, a zoomed in view of the label-retainer head 332 is also illustrated in FIG. 5A. The label-retainer head 332 is generally in the form of a plate or grill that is affixed onto an end of the label applicator 318. As such, the label-retainer head 332 includes a first side 338 (e.g., proximal side) that is oriented towards and closer to the tool base 330 and a second side 340 (e.g., distal side) that is oriented away from and farther from the tool base 330. In addition, the label-retainer head 332 includes a perimeter edge, wall, or side 342 (e.g., around the periphery of the plate) that generally defines a shape of the label-retainer head 332 and that spans between the first side 338 and the second side 340.

In a further aspect, the label-retainer head 332 includes a label-retaining surface 344 that at least temporarily engages a label when the label is being applied to a surface (e.g., of a package), and the label-retaining surface 344 may include one or more various properties. For example, in one aspect, the label-retaining surface 344 is positioned on the second or distal side 340 and faces away from the tool base 330. In a further aspect, the label-retaining surface 344 may include one or more label retainers or label-retaining features or components for retaining a label. For instance, the label-retaining surface 344 may include an aperture (e.g., 346) in fluid communication with a negative-pressure source, which may apply a suction force through the aperture and against a label to hold the label against the label-retaining surface 344. The label-retaining surface 344 may include other elements for at least temporarily retaining a label, such as a slot for receiving an edge or corner of a label, a pressure sensitive surface or layer, an electrostatic element, and the like.

In a further aspect of the present disclosure, the label-retaining surface 344 may be nonlinear or nonplanar. In other words, the label-retaining surface 344 may include peripheral surface portions (e.g., 348 and 350) opposite one another on opposing sides of a more central surface portion (e.g., 352), and the more central surface portion 352 is displaced with respect to the peripheral surface portions (e.g., not co-planar with or not collinear with). FIG. 5A illustrates one aspect in which the more central portion 352 is displaced outwardly and away from the tool base 330, such that the more central surface portion 352 protrudes from the label-retainer head 332 and towards a surface of a package that will receive a label.

Figure 5B:
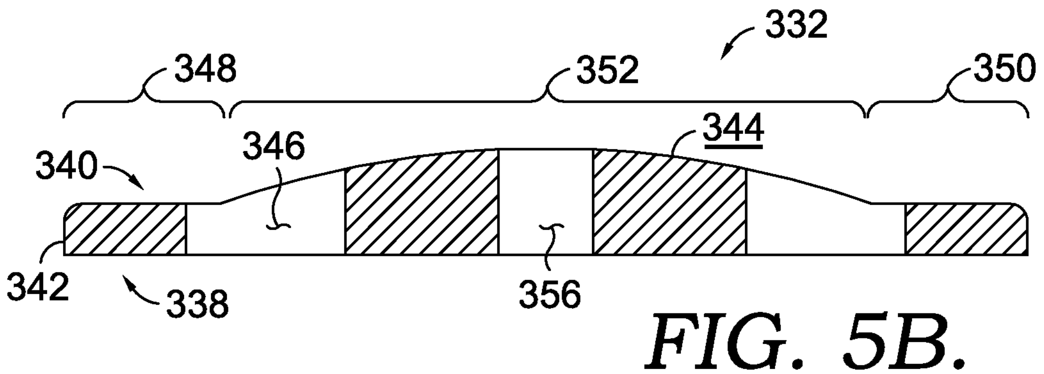
FIGS. 5B and 5C illustrate cross-sectional views taken along 5B-5B and 5C-5C in FIG. 5A, in accordance with an embodiment of the present disclosure.

The nonlinearity of the label-retaining surface 344 may be described in various manners. For example, in one aspect, the label-retaining surface 344 is nonlinear along a reference plane 5B-5B extending normal to the label-retaining surface 344, and an illustration of the label-retaining surface 344 extending nonlinearly along the reference plane 5B-5B is depicted in the cross-sectional view depicted in FIG. 5B. In some instances, the label-retaining surface 344 may be curvilinear along the reference plane extending normal to the label-retaining surface. In another aspect, the label-retaining surface 344 is convex along the reference plane extending normal to the label-retaining surface. When the label-retaining surface 344 is curvilinear, convex, or the like, a curve formed by the surface may have a constant radius (e.g., simple curve) or have multiple radii of various dimensions (e.g., complex curve).

Figure 5C:
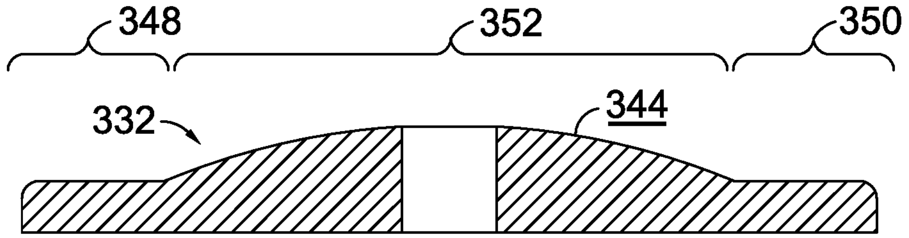

In the aspect depicted by FIG. 5A, the label-retaining surface 344 may be nonlinear in other respects as well. For example, the label-retaining surface 344 may be nonlinear along a second reference plane 5C-5C extending normal to the label-retaining surface 344 and extending perpendicular to the reference plane 5B-5B. An illustration of the label-retaining surface 344 extending nonlinearly along the reference plane 5C-5C is depicted in the cross-sectional view depicted in FIG. 5C. Similar to the aspects described with respect to FIG. 5B, in some instances, the label-retaining surface 344 may be curvilinear or convex along the reference plane 5C-5C. Furthermore, when the label-retaining surface 344 is curvilinear, convex, or the like, a curve formed by the surface may have a constant radius or have multiple radii of various dimensions. FIG. 5A depicts one aspect in which the label-retaining surface 344 is nonlinear in both reference planes 5B-5B and 5C-5C. In these aspects, the label-retaining surface may include a protruding, domal configuration having relatively consistently curved sides around the periphery. In an alternative aspect, the label-retaining surface 344 may be nonlinear in one of the reference planes and linear in the other of the reference planes (e.g., a semi- or partial-circular prism).

Figure 5D:
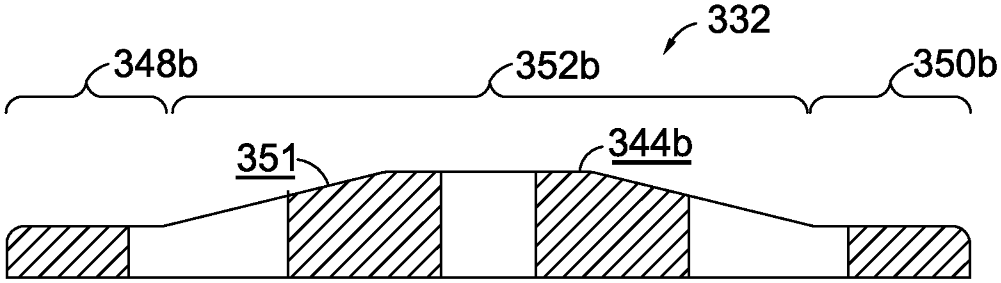
FIGS. 5D-5F illustrate cross-sectional views of alternative label-retainer heads, in accordance with alternative embodiments of the present disclosure.

The label-retaining surface 344 may be nonlinear in alternative respects. For example, in an alternative embodiment depicted by a cross-sectional view of FIG. 5D, the label-retaining surface 344*b* may include one or more sloped surfaces 351 between the peripheral surface portions 348*b* and 350*b* and the more central surface portions 352*b*, the one or more sloped surfaces 351 providing a transition between a surface of the peripheral surface portions 348*b* and 350*b* and an outermost surface of the more central surface portion 352*b*. In this aspect, the one or more sloped surfaces 351 may slope outward from the label-retainer head 332 and away from the tool base 330, such that the more central surface portion 352*b* protrudes, as depicted in FIG. 5D. Sloped surfaces and curved surfaces are not mutually exclusive, and in some aspects, the label-retaining surface may have both sloped surfaces and curved surfaces contributing to the nonlinearity.

Figure 5E:
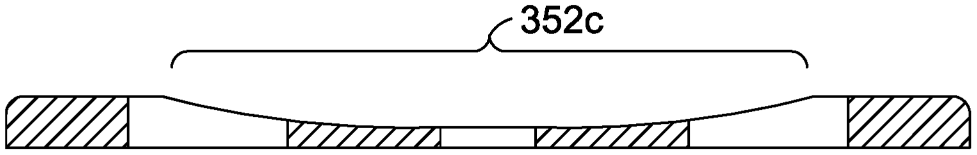
Figure 5F:
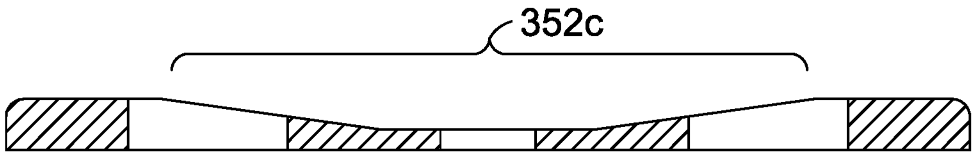

FIGS. 5A, 5B, 5C, and 5D depict aspects in which the more central surface portion 352 or 352*b* protrudes from the label-retainer head 332 and towards a surface of a package to which a label will be applied. These aspects may be used to apply labels to packages having concave surfaces, such as those depicted in FIG. 2 (e.g., 214*a* and 214*b*). In alternative aspects, the more central surface portion 352 may be displaced or recessed inwardly and towards the tool base, such that the more central surface portion 352 is nonlinearly recessed into the label-retainer head. For example, a recessed more central surface portion 352*c* may be formed by inwardly curving surfaces or inwardly sloping surfaces, as illustrated by the alternative cross-sectional views depicted by FIGS. 5E and 5F. These alternative aspects, in which the more central surface portion 352 is more recessed may be used to apply labels to packages having rounder surfaces (e.g., spherical, partial spheres, egg shaped, domal, etc.).

The label applicator 318 may include other elements as well. For example, as depicted in FIG. 4, the label applicator may include a sensor 354 to detect when a label is retained on the label-retaining surface 344 and when a label has been applied to a package (e.g., is no longer detected on the label-retaining surface 344). The sensor 354 may detect other inputs as well, such as an impact with a package. The sensor 354 may operate in various manners to detect these events. For example, the sensor 354 may transmit light or some other signal through a sensor-aligned aperture 356 (see e.g., FIGS. 5A and 5B) in the label-retainer head 332. In some instances, the sensor 354 may communicate signals to a computing device that controls operations of the actuator, the signals indicating to the computing device when a label is retrieved by the label applicator, when the label applicator contacts a package, and when the label is no longer retained on the label-retaining surface 344. In a further aspect, the sensor 354 is mounted to one or more other parts of the label applicator 318 by a mount 358.

Figure 6:
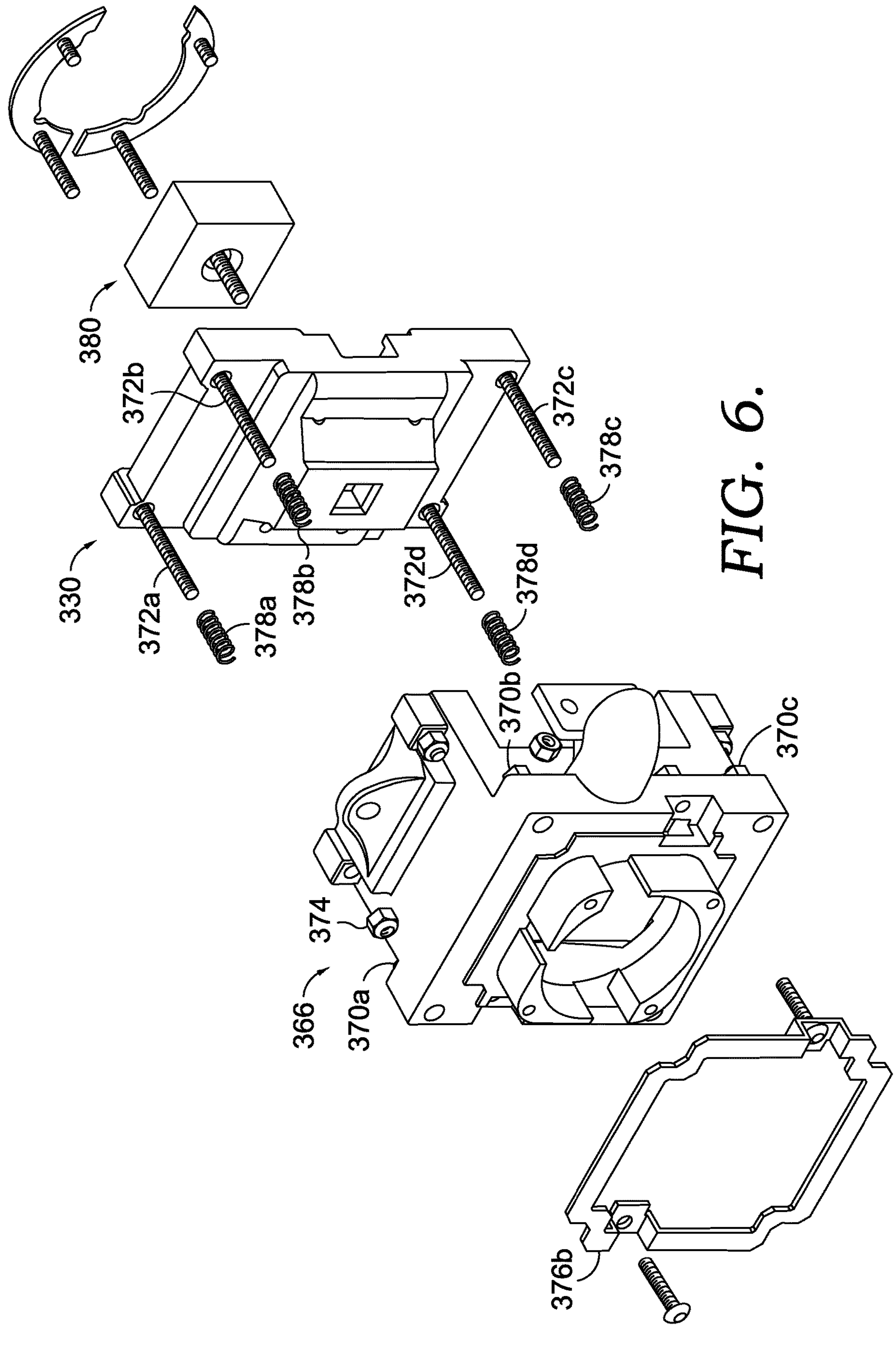
FIG. 6 is an enlarged view of a fan exhaust and a tool base from FIG. 4, in accordance with an embodiment of the present disclosure.
Figure 7:
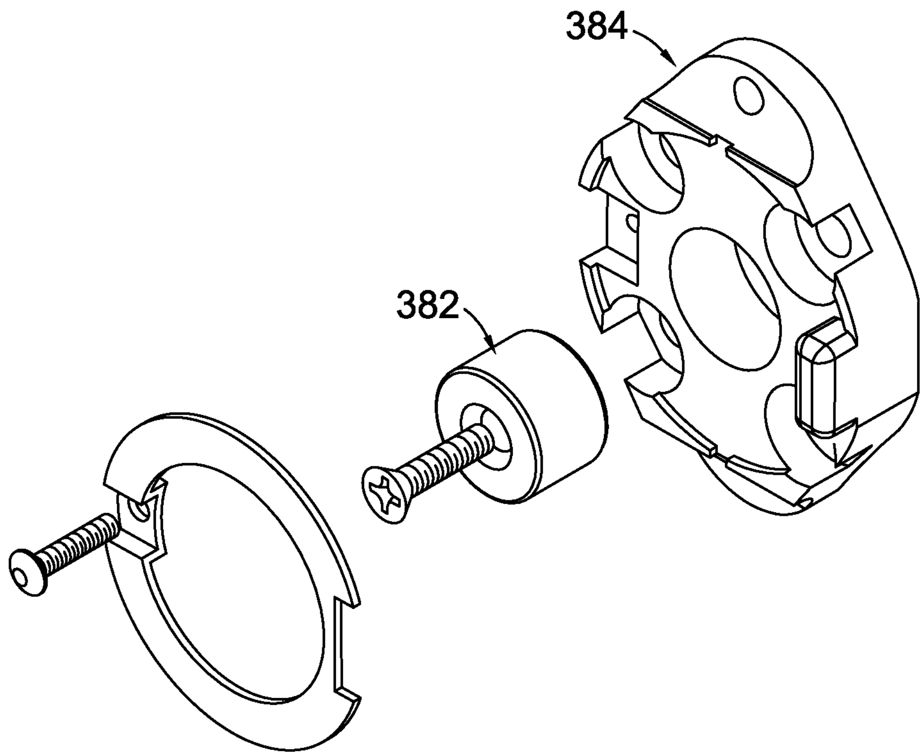
FIG. 7 is an enlarged view of an actuator base from FIG. 4, in accordance with an embodiment of the present disclosure.

In a further aspect of the present disclosure, the label applicator 318 includes a negative-pressure source or a connection to a negative-pressure source. For example, as depicted in FIGS. 3, 4 and 5A, in one example, the label applicator 318 includes a fan assembly 360, including a fan 362 housed in an intake hood 364. In addition, as depicted in FIGS. 3, 4, and 6, the label applicator 318 includes an exhaust assembly 366 to which air flow is directed from the fan assembly 360. The fan assembly 360 and exhaust assembly 366 may operate in various manners to provide a source of negative pressure. For example, the fan assembly 360 may pull air flow through the apertures 346 and 356 and direct the airflow to the exhaust assembly 366. In turn, the negative pressure pulled through the apertures 346 and 356 may retain (e.g., suck) a label against the label-retaining surface 344 until the label is applied to a package surface.

The fan assembly 360 and exhaust assembly 366 are an example of one type of negative-pressure source. In other aspects, the label applicator 318 may include an alternative negative-pressure source. For example, the label applicator 318 may include a vacuum ejector that is fluidly coupled (e.g., through a hose or other conduit) to an air compressor or other source of pressurized air, and the vacuum ejector may direct a negative pressure (e.g., suction) through the apertures 346 and 356.

The label applicator 318 may include various components sequentially positioned between the label-retainer head 332 and the tool base 330, and these components may be coupled in various manners. In one aspect of the disclosure, components of the label applicator 318 are coupled in a manner that permits the components to move with respect to one another when a label is applied to a package surface. For example, a first component may move towards, or pivot with respect to, a second component when a compressive force is applied on the label-retaining surface 344 in a direction towards the tool base 330. Referring to FIG. 3, an example of a force includes a compressive force "A" applied on the label-retaining surface 344 by a package surface during label application, and some potential resulting motion is illustrated by arrows "B" (e.g., components moving towards one another) and "C" (e.g., components pivoting with respect to one another).

In one aspect of the disclosure, the first component and the second component, which move with respect to one another (e.g., arrows B and C in FIG. 3), are coupled by a shaft, dowel, pin, or slide rail on which the first component, the second component, or both the first component and the second component move in response to the compressive force (e.g., arrow A in FIG. 3). For example, as depicted in the exploded view of FIG. 4, the intake hood 364 connects to the exhaust 366 by a set of shafted fasteners 368*a*, 368*b*, and 368*c* (e.g., a screw or bolt) and a fourth shafted fastener is hidden from view. Each of the shafted fasteners 368*a*, 368*b*, and 368*c* has a head 369*a*, 369*b*, and 369*c* positioned on one side of the intake hood 364 and connects to a respective nut (e.g., 370*a*, 370*b*, and 370*c*) behind a portion, flange, or wall of the exhaust 366. As such, when a compressive force (e.g., arrow A in FIG. 3) is applied to the label-retainer head 332, the intake hood 364, the exhaust 366, or both, may be movable with respect to the shafted fasteners 368*a*, 368*b*, and 368*c*, such that the intake hood 364 and the exhaust 366 may be biased towards one another (e.g., motion arrow "B" in FIG. 3).

Similarly, the exhaust 366 is coupled to the tool base 330 by another set of shafted fasteners 372*a*, 372*b*, 372*c*, and 372*d*, and nuts (e.g., nut 374 that attaches to the shafted fastener 372*a*), such that the exhaust 366 and the tool base 330 may be biased towards one another when a compressive force is applied to the label-retainer head 332. In a further embodiment, the exhaust 366, the tool base 330, or both may move more along one of the shafted fasteners than on another one of the shafted fasteners. For example, if a compressive force A is off center (e.g., focused closer to a peripheral surface portion 348 or 350), one portion of the exhaust 366 or the tool base 330 may move more than another portion of the exhaust 366 or the tool base 330, which may cause the exhaust 366 and the tool base 330 to articulate, pivot, or bank with respect to one another.

Although the figures illustrate screws or bolts, a variety of other shafted fasteners, such as pins, dowels, etc. might alternatively couple the intake hood 364 to the exhaust 366 and the exhaust 366 to the tool base 330 to permit the various components to be movable (e.g., arrows B and C in FIG. 3) towards one another upon receiving a compressive force against the label-retainer head 332. Moreover, although the figures illustrate nuts as a type of stop on one end of the shafted fasteners, in alternative aspects, other types of stops may be used, such as an external retainer ring or stop pin (e.g., cotter pin) coupled to the shafted fastener.

The label applicator 318 may include other connections as well between components, which may or may not have relative movement therebetween. For example, the label-retainer head 332 may connect to the intake hood 364 by a set of threaded fasteners. Likewise, the sensor 354 may attach to the sensor mount 358 by one or more threaded fasteners, and the sensor mount 358 may similarly connect to the fan 362. In addition, contact rings 376*a* and 376*b* may attach to the hood 364 and the exhaust 366, respectively. In one aspect, these components are relatively fixed with respect to one another, as compared with the intake hood 364, exhaust 366, and tool base 330, which may move with respect to one another.

In another aspect of the present disclosure, the label applicator 318 includes a force attenuator (e.g., at least one force attenuator) positioned between the label-retainer head 332 and the tool base 330. The force attenuator includes a device that dampens a force applied to the label-retaining surface 344 and transferred from the label-retaining surface 344 to other components of the label applicator 318, such as a compressive force applied by a package surface to the label-retaining surface 344 when a label retained on the label-retaining surface 344 is applied to the package surface. In addition to dampening, the force attenuator may also provide a return or responsive force. In one aspect, the force attenuator is a compressive spring positioned between components of the label applicator 318 that are biased towards one another upon receiving a compressive force.

For example, as described in other portions of this disclosure, the intake hood 364 and exhaust 366 are coupled in a manner (e.g., using shafted fasteners) to permit the intake hood 364 and exhaust 366 to be movable towards one another upon receiving a compressive force against the label-retainer head 332 (e.g., arrow B in FIG. 3). As such, an aspect of the present disclosure includes a force attenuator (e.g., compressive springs 334*a*, 334*b*, or 334*c*) affixed between the intake hood 364 and the exhaust 366. For instance, the compressive spring 334*c* may be slid onto the shafted fastener 368*c* when the intake hood 364 is connected to the exhaust during assembly.

In another aspect, and as described in other portions of this disclosure, the exhaust 366 and the tool base 330 are coupled in a manner (e.g., using shafted fasteners 372*a-d*) to permit the exhaust 366 and the tool base 330 to be movable towards one another upon receiving a compressive force against the label-retainer head 332 (e.g., arrow C in FIG. 3 illustrating motion towards, and potential pivoting or banking). As such, an aspect of the present disclosure includes a force attenuator (e.g., compressive springs 378*a-d*) affixed between the exhaust 366 and the tool base 330. For instance, the compressive spring 378*c* may be slid onto the shafted fastener 372*d* when the exhaust 366 is coupled to the tool base 330 during assembly.

In a further aspect, the shafted fasteners 372*a-d* and the force attenuator(s) (e.g., compressive springs 378*a-d*) form at least part of an articulation joint 336 between the exhaust 366 and the tool base 330. That is, as described in other portions of this disclosure, the connection between the exhaust 366 and the tool base 330 permits the two components to pivot or bank with respect to one another, such as when one portion of the exhaust 366 is moved closer to the tool base 330 than another portion of the exhaust. In addition, the force attenuator(s) operates to both dampen the motion and provide a return force to return the components to their aligned, at-rest position after a compressive force (e.g., A in FIG. 3) is removed. The articulation joint 336 may be a hinge articulation joint that permits pivoting motion in one plane or may be a multi-directional articulation joint that permits pivoting motion in multiple planes.

A force attenuator may be a single compressive spring or a group of compressive springs. In addition, although the figures illustrate one aspect in which the force attenuator is a compressive spring, in other aspects the label applicator 318 may include a different, or additional, type of force attenuator, such as a compressible gasket or biscuit made from a rubber or foamed material. In addition, although the figures illustrate four compressive springs, other aspects may include more than four compressive springs or fewer (e.g., one, two, or three compressive springs). Furthermore, the figures illustrate one aspect in which force attenuators are between the intake hood 364 and the exhaust 366 and between the exhaust and the tool base 330. In other aspects, additional force attenuators may be positioned between other components of the label applicator 318, or force attenuators may be omitted, such that the joints are relatively fixed between the intake hood 364 and the exhaust 366 and/or between the exhaust and the tool base 330.

The connections and joints among and between the various components of the label applicator 318 may operate in various manners to improve the likelihood labels will be applied in a manner which reduces the likelihood of unintentional detachment or misapplication across multiple packages having varied properties from one package to the next. For example, in one aspect, when the label-retaining surface 344 is pressed against a package surface (e.g., 215*a* or 215*b* in FIG. 2), the articulation joint 336 permits the label-retainer head 332 (and components attached thereto) to pivotably adjust to an orientation of a surface of a first package and return to a neutral position (e.g., using a return force of the force attenuator(s)) in preparation to apply a subsequent label to a second package. In another aspect, the movable joint or union between the intake hood 364 and the exhaust 366 and/or between the exhaust 366 and the tool base 330 (e.g., movable as illustrated by motion arrow B), combined with the force attenuator(s), dampens an impact between the label-applicator head 332 and a package surface, which may increase the dwell time during which a label is pressed against the package surface in a single location. In other words, if the label applicator 318 included only rigid connections without any give or dampening effect, then the label-retainer head 332 may be more apt to slide along, or glance off of, a package surface upon impact, which may reduce the amount of time a label is pressed in one position on the package surface. In other instances, if the label applicator 318 includes only rigid connections, then the package may be knocked out of position on impact or damaged. However, the force attenuation provided by the relative motion between components and the force attenuators improves the likelihood that the label-retainer head 332 will not slide along, or glance off of, the package surface, and that the package will not be knocked out of position or damaged.

The label applicator 318 may include further aspects. For example, the label applicator 318 may attach to a variety of different actuators. In one instance, the label applicator 318 attaches to an end 384 of an actuator (e.g., a robotic arm or other automated actuator). The coupling between the label applicator 318 and the actuator end 384 may vary depending on the application and on the actuator. For example, a mechanical fastener may attach the tool base 330 to the actuator end 384. In another aspect, referring to FIG. 4, a magnetic coupling may connect the tool base 330 to the actuator end 384. For example, the magnetic coupling may include a first magnetic element 380 fixedly coupled (e.g., by a screw, bolt, or other mechanical fastener) to the tool base 330 and a second magnetic element 382 fixedly coupled (e.g., by a screw, bolt, or other mechanical fastener) to the actuator end 384. The magnetic element may be a magnet or another material (e.g., metal) that is attracted to a magnet. In one aspect, at least one of the magnetic elements 380 or 382 is a rare-earth magnet (e.g., neodymium magnetic element).

In one aspect of the present disclosure, a magnetic coupling between the tool base 330 and the actuator end 384 provides a quick release or breakaway mechanism with rapid reattachment. For example, if the label applicator experiences a side impact (e.g., from a package or other object) the tool base 330 may temporarily detach (e.g., at least partially detach) from the actuator end 384 to reduce the likelihood of damage to the label applicator 318 and/or the impacted object. After detachment, the label applicator 318 may snap back into place, using the attraction between the magnetic elements 380 and 382 with or without manual assistance.

Some aspects of this disclosure have been described with respect to the examples provided in the figures. Additional aspects of the disclosure will now be described that may be related subject matter included in one or more claims of this application (e.g., claims at the time of filing). These additional aspects may include features illustrated by the figures, features not illustrated by the figures, and any combination thereof. When describing these additional aspects, reference may be made to elements depicted by the figures for illustrative purposes.

One aspect of the present disclosure relates to a label applicator that is traversed along a linear motion path to apply a label to a surface. For example, the label applicator 318 may be traversed along a motion path 122 to apply a label to a surface 215*a* or 215*b*. The label applicator may include a base portion to attach the label applicator to an actuator. For example, the base portion may include the tool base 330 to attach the label applicator 318 to the actuator end 384. The label applicator may also include a label-retainer head coupled to the base portion and extending transverse to the linear motion path. For instance, the label applicator 318 may include the label-retainer head 332 coupled (e.g., directly or indirectly) to the tool base 330, and the label-retainer head 332 may extend transverse to the motion path 112 when the label applicator 318 applies a label. In a further aspect, the label-retainer head comprises a label-retaining surface that at least temporarily engages the label when applied to the surface, and the label-retaining surface is nonlinear along a reference plane extending normal to the label-retaining surface. For example, the label-retainer head 332 includes the label-retaining surface 344 against which a label is held (e.g., using negative pressure) when the label is being applied. As further examples, the label-retaining surface 344 may be nonlinear in various manners, as illustrated by the cross sections in FIGS. 5B-5F.

Another aspect of the present disclosure includes a label applicator that is traversed along a linear motion path to apply a label to a surface. For example, the label applicator 318 may be traversed along a motion path 122 to apply a label to a surface 215*a* or 215*b*. The label applicator may include a base portion to attach the label applicator to an actuator. For example, the base portion may include the tool base 330 to attach the label applicator 318 to the actuator end 384. The label applicator may also include a label-retainer head coupled to the base portion and extending transverse to the linear motion path. For instance, the label applicator 318 may include the label-retainer head 332 coupled (e.g., directly or indirectly) to the tool base 330, and the label-retainer head 332 may extend transverse to the motion path 112 when the label applicator 318 applies a label. In a further aspect, the label-retainer head comprises a label-retaining surface that at least temporarily engages the label when applied to the surface. For example, the label-retainer head 332 includes the label-retaining surface 344 against which a label is held (e.g., using negative pressure) when the label is being applied. The label applicator may also include a force attenuator positioned between the label-retaining surface and the base portion to dampen a force applied to the label-retaining surface. Examples of force attenuators include one or more of the compression springs 334*a-c* or 378*a-d*, which may be positioned between various components of the label applicator (e.g., between the intake hood and the exhaust and/or between the exhaust and the tool base and/or between other components of the label applicator). In addition, the label applicator 318 includes an articulation joint positioned between the label-retaining surface and the base portion. For example, the articulation joint 336 is one example, and an articulation joint may be positioned between various components of the label applicator (e.g., between the intake hood and the exhaust and/or between the exhaust and the tool base and/or between other components of the label applicator).

Yet a further aspect of the present disclosure is directed to a label applicator that is traversed along a linear motion path to apply a label to a surface. For example, the label applicator 318 may be traversed along a motion path 122 to apply a label to a surface 215*a* or 215*b*. The label applicator may include a base portion comprising a magnetic element to magnetically attach the label applicator to an actuator. For instance, the label applicator 318 may include the tool base 330 including the magnetic element 380 to magnetically attach the label applicator 318 to the actuator end 384. In a further aspect, the label applicator may also include a label-retainer head coupled to the base portion and extending transverse to the linear motion path. For instance, the label applicator 318 may include the label-retainer head 332 coupled (e.g., directly or indirectly) to the tool base 330, and the label-retainer head 332 may extend transverse to the motion path 112 when the label applicator 318 applies a label. In a further aspect, the label-retainer head comprises a label-retaining surface that at least temporarily engages the label when applied to the surface, and the label-retaining surface is nonlinear along a reference plane extending normal to the label-retaining surface. For example, the label-retainer head 332 includes the label-retaining surface 344 against which a label is held (e.g., using negative pressure) when the label is being applied. As further examples, the label-retaining surface 344 may be nonlinear in various manners, as illustrated by the cross sections in FIGS. 5B-5F. In addition, the label applicator may include an articulation joint positioned between the label-retaining surface and the base portion. For example, the articulation joint 336 is one example, and an articulation joint may be positioned between various components of the label applicator (e.g., between the intake hood and the exhaust and/or between the exhaust and the tool base and/or between other components of the label applicator).

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

From the foregoing, it will be seen that this disclosed subject matter is well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A label applicator that is traversed along a linear motion path to apply a label to a surface, the label applicator comprising:

a base portion;

a label-retainer head;

a fan assembly;

an exhaust assembly;

one or more force attenuators; and one or more multi-directional articulation joints, wherein:

the base portion is configured to attach the label applicator to an actuator, the label-retainer head extends transverse to the linear motion path, comprises a label-retaining surface that engages the label when the label is applied to the surface, is configured to hold the label using a negative pressure when the label is applied, and is nonlinear along a reference plane extending normal to the label-retaining surface, the fan assembly is configured to pull airflow through at least one aperture in the label-retainer head and direct the airflow to the exhaust assembly to provide a source of the negative pressure, the fan assembly is coupled to the exhaust assembly via the one or more force attenuators in a manner to permit at least one of the fan assembly to be movable towards the exhaust assembly or the exhaust assembly to be movable towards the fan assembly upon receiving a compressive force against the label-retainer head to dampen the compressive force, and the one or more multi-directional articulation joints are positioned between the label-retaining surface and the base portion and are configured to permit the label-retaining surface and the base portion to pivot in multiple planes to angularly adjust an orientation of the label applicator.

2. The label applicator of claim 1, wherein the label-retaining surface is curvilinear along the reference plane extending normal to the label-retaining surface.

3. The label applicator of claim 1, wherein the label-retaining surface is convex along the reference plane extending normal to the label-retaining surface.

4. The label applicator of claim 1, wherein the label-retaining surface is nonlinear along a second reference plane extending normal to the label-retaining surface and extending perpendicular to the reference plane.

5. The label applicator of claim 1, wherein the label-retaining surface is domal and extends away from the base portion.

6. The label applicator of claim 1, wherein the at least one aperture is in fluid communication with the fan assembly, and the negative pressure applied to the at least one aperture retains the label against the label-retaining surface.

7. The label applicator of claim 1 further comprising, a magnetic element coupled to the base portion to magnetically couple the label applicator to the actuator.

8. A label applicator that is traversed along a linear motion path to apply a label to a surface, the label applicator comprising:

a base portion;
a label-retainer head;
a fan assembly;
an exhaust assembly;
one or more force attenuators; and
one or more multi-directional articulation joints, wherein:
the base portion comprises a magnetic element configured to magnetically attach the label applicator to an actuator,
the label-retainer head extends transverse to the linear motion path, comprises a label-retaining surface that engages the label when the label is applied to the surface, is configured to hold the label using negative pressure when the label is applied, and is nonlinear along a reference plane extending normal to the label-retaining surface,
the fan assembly is configured to pull airflow through at least one aperture in the label-retainer head and direct the airflow to the exhaust assembly to provide a source of the negative pressure,
the fan assembly is coupled to the exhaust assembly via the one or more force attenuators in a manner to permit at least one of the fan assembly to be movable towards the exhaust assembly or the exhaust assembly to be movable towards the fan assembly upon receiving a compressive force against the label-retainer head to dampen the compressive force, and
the one or more multi-directional articulation joints are positioned between the label-retaining surface and the base portion and are configured to permit the label-retaining surface and the base portion to pivot in multiple planes to angularly adjust an orientation of the label applicator.

9. The label applicator of claim 8, wherein the label-retaining surface is nonlinear along a second reference plane extending normal to the label-retaining surface and extending perpendicular to the reference plane.

10. The label applicator of claim 8, wherein each of the one or more multi-directional articulation joints comprises a shafted fastener configured to couple the exhaust assembly to the base portion and a compression spring on the shafted fastener.

11. The label applicator of claim 1, wherein the fan assembly is coupled to the exhaust assembly via one or more shafted fasteners, and the one or more force attenuators are affixed on the one or more shafted fasteners.

12. The label applicator of claim 1, wherein each of the one or more multi-directional articulation joints comprises a shafted fastener configured to couple the exhaust assembly to the base portion and a compression spring on the shafted fastener.

13. The label applicator of claim 1, wherein each of the one or more multi-directional articulation joints is configured to provide a return force to return at least one of the label-retaining surface or the base portion to an at-rest position after the compressive force is removed.

14. The label applicator of claim 1 further comprising a sensor configured to at least one of detect when the label is retained on the label-retaining surface or when the label has been applied to the surface and communicate with a computing device that controls operation of the actuator.

15. The label applicator of claim 8, wherein the fan assembly is coupled to the exhaust assembly via one or more shafted fasteners, and the one or more force attenuators are affixed on the one or more shafted fasteners.

16. The label applicator of claim 8, wherein each of the one or more multi-directional articulation joints is configured to provide a return force to return at least one of the label-retaining surface or the base portion to an at-rest position after the compressive force is removed.

17. The label applicator of claim 8 further comprising a sensor configured to at least one of detect when the label is retained on the label-retaining surface or when the label has been applied to the surface and communicate with a computing device that controls operation of the actuator.

18. A label applicator that is traversed along a linear motion path to apply a label to a surface, the label applicator comprising:

a base portion;
a label-retainer head;
a fan assembly;
an exhaust assembly; and
one or more force attenuators, wherein:
the base portion is configured to attach the label applicator to an actuator,
the label-retainer head extends transverse to the linear motion path, comprises a label-retaining surface that engages the label when the label is applied to the surface, is configured to hold the label using a negative pressure when the label is applied, and is nonlinear along a reference plane extending normal to the label-retaining surface,
the fan assembly is configured to pull airflow through at least one aperture in the label-retainer head and direct the airflow to the exhaust assembly to provide a source of the negative pressure, and
the fan assembly is coupled to the exhaust assembly via the one or more force attenuators in a manner to permit at least one of the fan assembly to be movable towards the exhaust assembly or the exhaust assembly to be moveable towards the fan assembly upon receiving a compressive force against the label-retainer head to dampen the compressive force.

19. The label applicator of claim 18, wherein the fan assembly is coupled to the exhaust assembly via one or more shafted fasteners, and the one or more force attenuators are affixed on the one or more shafted fasteners.

20. The label applicator of claim 18 further comprising a sensor configured to at least one of detect when the label is retained on the label-retaining surface or when the label has been applied to the surface and communicate with a computing device that controls operation of the actuator.

* * * * *